(12) United States Patent
Peuhkurinen

(10) Patent No.: US 11,055,049 B1
(45) Date of Patent: Jul. 6, 2021

(54) SYSTEMS AND METHODS FOR FACILITATING SHARED RENDERING

(71) Applicant: Varjo Technologies Oy, Helsinki (FI)

(72) Inventor: Ari Antti Peuhkurinen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 16/876,208

(22) Filed: May 18, 2020

(51) Int. Cl.
*G09G 5/00* (2006.01)
*G06F 3/14* (2006.01)
*G06T 7/73* (2017.01)

(52) U.S. Cl.
CPC .......... *G06F 3/1438* (2013.01); *G06F 3/1454* (2013.01); *G06T 7/73* (2017.01); *G06T 2207/30204* (2013.01)

(58) Field of Classification Search
CPC .... G02B 2027/0132; G02B 2027/0147; G02B 26/10; G02B 26/101; G02B 27/0093; G02B 27/0172; G06F 3/013; G09G 2340/0407; G09G 2354/00; G09G 2360/18; G09G 3/02; H04N 13/365; H04N 13/383; H04N 9/3129; H04N 9/3164; H04N 9/3188
See application file for complete search history.

(56) References Cited

U.S. PATENT DOCUMENTS

2007/0290996 A1\* 12/2007 Ting ...................... G06F 3/0386
345/157
2008/0030429 A1\* 2/2008 Hailpern ................. A63F 13/52
345/8

\* cited by examiner

*Primary Examiner* — Insa Sadio
(74) *Attorney, Agent, or Firm* — Ziegler IP Law Group, LLC

(57) ABSTRACT

A system for facilitating shared rendering between display devices including first display device and second display device that are communicably coupled with first computing device and second computing device, respectively. The system includes means for tracking pose of first display device, means for tracking pose of second display device, image server, first client, second client. First client is configured to: send, to image server, first information indicative of pose of first display device; receive first image frame; render first image frame at first display device; receive second information indicative of pose of second display device; send, to image server, second information; receive second image frame; and send second image frame, wherein second client renders second image frame at second display device.

7 Claims, 4 Drawing Sheets

SYSTEMS AND METHODS FOR FACILITATING SHARED RENDERING

TECHNICAL FIELD

The present disclosure relates generally to shared rendering; and more specifically, to systems for facilitating shared rendering between a plurality of display devices. The present disclosure also relates to methods of facilitating shared rendering between the plurality of display devices.

BACKGROUND

Nowadays, interactive visual content is not limited to being displayed only on a single display device. Several advancements are being made to develop interactive visual content that can be accessed by multiple users using multiple display devices. For example, collaborative extended-reality games, tutorials, simulators, and the like, can be accessed by multiple users using multiple extended-reality display apparatuses.

Development and rendering of interactive visual content for multiple display devices is quite complex, and is associated with several limitations. Firstly, a dedicated image server is generally employed to generate display-device-specific visual content for its corresponding display device. Therefore, when visual content is to be generated for multiple display devices, multiple image servers are used for said generation. This considerably increases costs, space requirements, processing complexity, and computing power requirements associated with visual content development. Secondly, to enable collaboration of users of multiple display devices, considerable changes are required to be made to an image server that generates visual content for a single display device only. These changes also require a considerable amount of display-device-specific information (for example, such as device specifications, device pose, and the like) of several display devices among the multiple display devices, which may not always be available or be accurate.

Therefore, in light of the foregoing discussion, there exists a need to overcome the aforementioned drawbacks associated with shared rendering of visual content between multiple display devices.

SUMMARY

The present disclosure seeks to provide a system for facilitating shared rendering between a plurality of display devices. The present disclosure also seeks to provide a method of facilitating shared rendering between the plurality of display devices. The present disclosure seeks to provide a solution to the existing problems associated with use of multiple image servers and requirement of making considerable changes to a single image server for facilitating sharing of visual content between multiple display devices. An aim of the present disclosure is to provide a solution that overcomes at least partially the problems encountered in prior art, and provides a system that facilitates shared rendering between multiple display devices without using excessive computing resources or making any changes to the image server.

In one aspect, an embodiment of the present disclosure provides a system for facilitating shared rendering between a plurality of display devices, the plurality of display devices comprising a first display device and a second display device that are communicably coupled with a first computing device and a second computing device, respectively, the first computing device being communicably coupled with the second computing device, the system comprising:

means for tracking a device pose of the first display device;

means for tracking a device pose of the second display device;

an image server, executing on at least one processor of the first computing device, configured to generate a given image frame based on a given device pose;

a first client executing on the at least one processor of the first computing device; and a second client executing on at least one processor of the second computing device, wherein the first client is configured to:

send, to the image server, first information indicative of the device pose of the first display device;

receive, from the image server, a first image frame generated based on the device pose of the first display device;

render the first image frame at the first display device;

receive, from the second client, second information indicative of the device pose of the second display device;

send, to the image server, the second information;

receive, from the image server, a second image frame generated based on the device pose of the second display device; and send the second image frame to the second client, wherein the second client is configured to render the second image frame at the second display device.

In another aspect, an embodiment of the present disclosure provides a method of facilitating shared rendering between a plurality of display devices, the plurality of display devices comprising a first display device and a second display device that are communicably coupled with a first computing device and a second computing device, respectively, the first computing device being communicably coupled with the second computing device, the method comprising:

tracking a device pose of the first display device;

tracking a device pose of the second display device;

sending, from a first client to an image server, first information indicative of the device pose of the first display device, wherein the first client and the image server are executing on at least one processor of the first computing device;

generating, at the image server, a first image frame based on the device pose of the first display device;

receiving, from the image server, the first image frame;

rendering the first image frame at the first display device;

receiving, from a second client executing on at least one processor of the second computing device, second information indicative of the device pose of the second display device;

sending, from the first client to the image server, the second information;

generating, at the image server, a second image frame based on the device pose of the second display device;

receiving, from the image server, the second image frame;

sending, to the second client, the second image frame; and rendering the second image frame at the second display device.

Embodiments of the present disclosure substantially eliminate or at least partially address the aforementioned problems in the prior art, and enable shared rendering between multiple display devices in a resource-efficient and computation-efficient manner.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
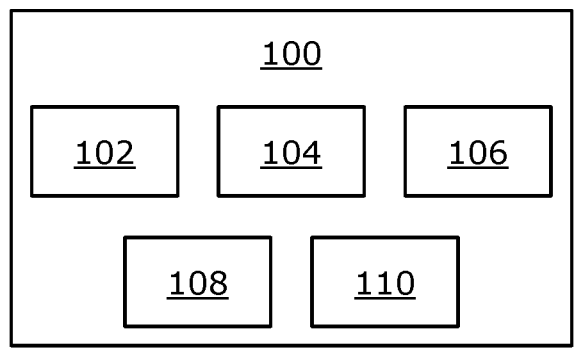
FIG. 1 illustrates a block diagram of architecture of a system for facilitating shared rendering between a plurality of display devices, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a system for facilitating shared rendering between a plurality of display devices, the plurality of display devices comprising a first display device and a second display device that are communicably coupled with a first computing device and a second computing device, respectively, the first computing device being communicably coupled with the second computing device, the system comprising:

means for tracking a device pose of the first display device;

means for tracking a device pose of the second display device;

an image server, executing on at least one processor of the first computing device, configured to generate a given image frame based on a given device pose;

a first client executing on the at least one processor of the first computing device; and a second client executing on at least one processor of the second computing device, wherein the first client is configured to:

send, to the image server, first information indicative of the device pose of the first display device;

receive, from the image server, a first image frame generated based on the device pose of the first display device;

render the first image frame at the first display device;

receive, from the second client, second information indicative of the device pose of the second display device;

send, to the image server, the second information;

receive, from the image server, a second image frame generated based on the device pose of the second display device; and send the second image frame to the second client, wherein the second client is configured to render the second image frame at the second display device.

In another aspect, an embodiment of the present disclosure provides a method of facilitating shared rendering between a plurality of display devices, the plurality of display devices comprising a first display device and a second display device that are communicably coupled with a first computing device and a second computing device, respectively, the first computing device being communicably coupled with the second computing device, the method comprising:

tracking a device pose of the first display device;

tracking a device pose of the second display device;

sending, from a first client to an image server, first information indicative of the device pose of the first display device, wherein the first client and the image server are executing on at least one processor of the first computing device;

generating, at the image server, a first image frame based on the device pose of the first display device;

receiving, from the image server, the first image frame;

rendering the first image frame at the first display device;

receiving, from a second client executing on at least one processor of the second computing device, second information indicative of the device pose of the second display device;

sending, from the first client to the image server, the second information;

generating, at the image server, a second image frame based on the device pose of the second display device;

receiving, from the image server, the second image frame;

sending, to the second client, the second image frame; and rendering the second image frame at the second display device.

The present disclosure provides the aforementioned system and the aforementioned method for facilitating shared rendering between a plurality of display devices. Herein, a single image server is employed to generate visual content for multiple display devices. This considerably reduces costs, space requirements, computational complexity and computing power requirements associated with visual content development. Furthermore, to enable shared rendering of the visual content between multiple display devices, no changes are required to be made to the image server for making it suitable for shared use. In other words, the same image server can be used as a single display device-based application and/or a multiple display device-based application. Notably, the first client communicates efficiently with the image server to provide the image server with information indicative of device poses of the plurality of display devices. The image server then utilizes these device poses to generate image frames for each of the plurality of display devices. In this way, a single image server is used to generate image frames for multiple display devices without requiring any changes to be made. Therefore, users of these multiple display devices can interact with each other in a collaborative manner via their respective display devices.

It will be appreciated that the system facilitates shared rendering between the plurality of display devices in real time or near-real time. The system comprises specialized equipment configured to perform specialized tasks for effectively facilitating shared rendering between the plurality of display devices.

Throughout the present disclosure, the term "display device" refers to any device that is capable of displaying images. Examples of a given display device include, but are not limited to, a television, a desktop computer, a laptop computer, a tablet computer, a phablet, a head-mounted display, and a smartphone.

Optionally, a given display device is implemented as a display apparatus. Herein, the term "display apparatus" refers to a specialized equipment that is configured to present an extended-reality (XR) environment to a user when the display apparatus in operation is worn by the user on his/her head. In such an instance, the display apparatus acts as a display device (for example, such as an XR headset, a pair of XR glasses, and the like) that is operable to present a visual scene of the XR environment to the user. The visual scene of the XR environment comprises a sequence of XR image frames. Commonly, the "display apparatus" is referred to as "head-mounted display" or "head-mounted display apparatus", for the sake of convenience only. Herein, the term "extended-reality" encompasses virtual reality, augmented reality, mixed reality, and the like.

In one embodiment, the XR image frames are virtual-reality (VR) image frames. The VR image frames, when displayed, present a visual scene of a VR environment to the user. In another embodiment, the XR image frames are augmented-reality (AR) image frames. The AR image frames, when displayed, present a visual scene of an AR environment to the user. In yet another embodiment, the XR image frames are mixed-reality (MR) image frames. The MR image frames, when displayed, present a visual scene of a MR environment to the user.

The plurality of display devices comprise the first display device and the second display device. In this regard, the first display device may be associated with a first user, whereas the second display device may be associated with a second user. The first display device may be understood to be a host device, whereas the second display device may be understood to be a client device. It will be appreciated that the plurality of display devices optionally includes other display device(s) in addition to the first display device and the second display device. In such a case, the first display device is the host device, while the second display device and the other display device(s) (for example, such as a third display device, a fourth display device, a fifth display device, and so on) are the client devices.

A given display device is communicably coupled with its corresponding computing device. The first display device is communicably coupled with the first computing device either directly, or via a communication network. Likewise, the second display device is communicably coupled with the second computing device either directly, or via a communication network. The first computing device may be understood to be a "host computer", whereas the second computing device may be understood to be a "client computer". Optionally, the first computing device is communicably coupled with the second computing device either directly, or via a communication network.

It will be appreciated that a given communication network may be wired, wireless, or a combination thereof. Examples of the given communication network may include, but are not limited to, Internet, a local network (such as, a TCP/IP-based network, an Ethernet-based local area network, an Ethernet-based personal area network, a Wi-Fi network, and the like), and a short range radio network (such as Bluetooth®).

Throughout the present disclosure, the term "computing device" refers to a processing device that performs data processing operations for enabling display of image frames at a given display device to which it is communicably coupled. A given computing device could be external to its corresponding display device or could be integrated with its corresponding display device. Optionally, the given computing device comprises a graphics processing device (for example, such as a Graphics Processing Unit (GPU)). Examples of the given computing device include, but are not limited to, a laptop computer, a desktop computer, a tablet computer, a phablet, a smartphone, a personal digital assistant, a workstation, a console.

A given computing device comprises at least one processor configured to perform the data processing operations for enabling display of images at a corresponding display device. Throughout the present disclosure, the term "processor" refers to hardware, software, firmware or a combination of these. Throughout the present disclosure, the "at least one processor of the first computing device" may be referred to as "at least one host processor" whereas the "at least one processor of the second computing device" may be referred to as "at least one client processor". When the plurality of display devices optionally include the other display device(s), processor(s) of the other display device(s) is/are also client processor(s). It will be appreciated that the term "at least one processor" refers to "one processor" in some implementations, and "a plurality of processors" in other implementations.

Throughout the present disclosure, the term "means for tracking a device pose" refers to specialized equipment that is employed to detect and/or follow a device pose of a given display device within a real-world environment. It will be appreciated that the system comprises different means for tracking device poses of different display devices (such as the first display device and the second display device). In some implementations, both the first display device and the second display device are used in a same real-world environment, so their device poses are tracked in the same real-world environment. In other implementations, the first display device and the second display device are used in different real-world environments, so their device poses are tracked separately in the different real-world environments.

Hereinafter, the "means for tracking the device pose of the first display device" is referred to as "first means for tracking the device pose" and the "means for tracking the device pose of the second display device" is referred to as "second means for tracking the device pose", for the sake of convenience only.

Throughout the present disclosure, the term "device pose" encompasses both position of the given display device and orientation of the given display device.

Pursuant to embodiments of the present disclosure, a given means for tracking a device pose of a given display device is implemented as a true six Degrees of Freedom (6DoF) tracking system. In other words, said means tracks both the position and the orientation of the given display device within a three-dimensional (3D) space of the real-world environment in which the given display device is used. In particular, said means is configured to track translational movements (namely, surge, heave and sway movements) and rotational movements (namely, roll, pitch and yaw movements) of the given display device within the 3D space.

It will be appreciated that the given means for tracking the device pose of the given display device could be implemented as an internal component of the given display device, as a tracking system external to the given display device, or as a combination thereof.

Optionally, a given means for tracking a device pose of a given display device comprises at least one of: an accelerometer, a gyroscope, an Inertial Measurement Unit (IMU), a Timing and Inertial Measurement Unit (TIMU).

Optionally, a given means for tracking a device pose of a given display device comprises:

at least one detectable marker arranged at a fixed location in a real-world environment in which the given display device is present; and at least one detector arranged on the given display device, wherein the at least one detector is configured to detect the at least one detectable marker and determine a relative pose of the at least one detectable marker with respect to the at least one detector, wherein a given client is configured to determine the device pose of the given display device, based on the fixed location of the at least one detectable marker and the relative pose of the at least one detectable marker with respect to the at least one detector.

Optionally, a given means for tracking a device pose of a given display device comprises:

at least one detectable marker arranged on the given display device; and at least one detector arranged at a fixed location within a real-world environment in which the given display device is present, wherein the at least one detector is configured to detect the at least one detectable marker and determine a relative pose of the at least one detectable marker with respect to the at least one detector, wherein a given client is configured to determine the device pose of the given display device, based on the fixed location of the at least one detector and the relative pose of the at least one detectable marker with respect to the at least one detector.

Optionally, the at least one detectable marker is implemented as at least one of: an active infra-red (IR) LED, a visible LED, a laser illuminator, a Quick Response (QR) code, an ArUco marker, a Radio Frequency Identification (RFID) marker and the like), whereas the at least one detector is implemented as at least one of: an IR camera, an IR transceiver, a visible light camera, an RFID reader.

In an example, the given means for tracking the device pose of the given display device may be implemented as Valve Corporation's SteamVR® tracking, where active lighthouses (namely, detectable objects) sending infrared signals are installed at fixed locations in the real-world environment in which the given display device is being used. In such a case, the given display device comprises detectors that detect these infrared signals and determine the pose (namely, the position and orientation) of the given display device relative to the fixed locations of the lighthouses.

In another example, the given means for tracking the device pose of the given display device may be implemented as a magnetic tracking system (for example, such as magnetic tracking from Polhemus), where an active magnetic field is generated using a transmitter in the real-world environment, and at least one receiver that is capable of sensing the magnetic field is installed into the given display device.

In yet another example, the given means for tracking the device pose of the given display device may be implemented as an optical outside-in tracking technique (for example, such as OptiTrack™ and ART tracking), where the given display device is fitted with IR retroreflective markers or IR LEDs, and at least one IR camera is installed in the real-world environment to capture IR light reflected from the markers or emitted by the IR LEDs.

Throughout the present disclosure, the term "image server" refers to hardware, software, firmware or a combination of these that generates a given image frame based on a given device pose of a given display device. The image server is an application, program or process executing on the at least one processor of the first computing device that responds to requests for generation of image frames by the first client. The term "image server" also encompasses software that makes the act of generating image frames possible. As an example, the image server may be an XR application that generates XR image frames, based on device poses of display devices. Image frame generation is well-known in the art.

It will be appreciated that the image server generates pose-consistent image frames for the plurality of display devices. Notably, the image server executes on the at least one host processor and the first client sends requests to the image server for generation of image frames for each of the plurality of display devices. The image server generates image frames not only for the first display device that is communicably coupled to the first display device, but also for the second display device (and optionally, other display devices that may be present in the system and be communicably coupled to the first computing device). Using a single image server for generating image frames for multiple display devices is resource-efficient, cost-efficient, computationally efficient and space-efficient.

The image server, in operation, generates image frames that are to be rendered at the plurality of display devices, according to their corresponding device poses. Optionally, a given image frame is an XR image frame. The XR image frame may pertain to an XR game, an XR tutorial, an XR instructional simulator, an XR movie, an XR educational video, and the like. As an example, the image server may generate XR image frames pertaining to a multi-player XR shooting game for the plurality of display devices. A user of a display device would view XR image frames corresponding to his/her display device only. Users of these display devices may interact with each other in a collaborative manner whilst engaging with an XR environment constituted by the XR image frames. This collaborative interaction is beneficially enabled by clients of these display devices without making any changes to the image server.

Optionally, when generating a given image frame for a given device pose, the image server is configured to employ at least one image processing algorithm. Optionally, in this regard, the at least one image processing algorithm is at least one of: a computer-generated imagery algorithm, an image cropping algorithm, an image flipping algorithm, an image rotating algorithm, an image sharpening algorithm, an image smoothing algorithm, an image blurring algorithm, an image resizing algorithm, an image orientation algorithm, an image colour-change algorithm, an image merging algorithm, an image slicing algorithm, an image layering algorithm, an image blending algorithm, an image special-effects algorithm.

Optionally, the image server executes on at least one external processor and/or a cloud-based processor coupled in communication with the first computing device (and specifically, with the first client).

Throughout the present disclosure, the term "client" refers to hardware, software, firmware or a combination of these. A given client is an application, program or process executing on at least one processor of a given computing device. The given client performs tasks pertaining to rendering of image frames at a given display device associated with the given computing device. The first client receives both the first image frame and the second image frame from the image server, and then sends the second image frame to the second client. Therefore, the first client also acts as an intermediate interface between the image server and the second client.

The first client executes on the at least one host processor of the first computing device. Herein, the first client may be understood to be a "fat client executing on the at least one host processor". The second client executes on the at least one processor of the second computing device. Herein, the second client may be understood to be a "thin client executing on the at least one client processor". It will be appreciated that the first client provides greater processing functionality in the system, as compared to the second client. Notably, the first client is communicably coupled to the second client either directly, or via a communication network.

Throughout the present disclosure, a "given information indicative of the device pose of a given display device" refers to information that indicates the position and the orientation of the given display device within a real-world environment in which the given display device is present. In particular, the given information indicative of the device pose of the given display device is indicative of tracked translational movements and rotational movements of the given display device within the real-world environment.

Optionally, the given information indicative of the device pose of the given display device is derived using tracking data generated by means for tracking the device pose of the given display device. Optionally, the tracking data comprises at least one three-dimensional (3D) position and/or at least one three-dimensional (3D) orientation of the given display device within a given real-world environment. Optionally, the given real-world environment is represented by a coordinate system having a predefined origin and three coordinate axes, for example, such as X, Y and Z axes. Optionally, a 3D position of the given display device is expressed as (x, y, z) position coordinates along the X, Y and Z axes, respectively. Optionally, a 3D orientation of the given display device is expressed as at least one of: Euler angles, quaternions, rotation matrices, axis angles. It will be appreciated that other conventions for expressing the device pose of the given display device in the real-world environment space and representing all 6DoF (namely, three translational degrees of freedom and three rotational degrees of freedom) can be employed alternatively.

The first client sends the first information indicative of the device pose of the first display device (hereinafter referred to as "first information", for sake of convenience only) to the image server. Optionally, the first client is configured to process tracking data obtained from the first means for tracking the device pose to derive the first information. Herein, the first client is communicably coupled to both the first means for tracking the device pose and the image server either directly, or via a communication network.

The first client sends the first information to the image server. The image server generates the first image frame for the first display device, the first image frame being consistent with the device pose of the first display device. The first information is effectively utilized by the image server to generate the first image frame. The image server then sends the first image frame to the first client. The first client receives the first image frame from the image server. The first client renders the first image frame at the first display device.

It will be appreciated that the first display device, in operation, would attain a plurality of device poses. The first information would be updated with these plurality of device poses. Therefore, the image server would generate a plurality of first image frames, based on the plurality of device poses of the first display device. The first client would render the plurality of first image frames at the first display device.

Optionally, the first display device comprises at least one display and/or at least one projector configured to render the first image frame.

Throughout the present disclosure, the term "display" refers to equipment that, in operation, displays a given image frame that is to be shown to a user of a given display device, whereas the term "projector" refers to equipment that, in operation, projects the given image frame that is to be shown to a user of a given display device. Optionally, a given projector projects the given image frame onto a projection screen or directly onto a retina of eye(s) of the user.

Optionally, the at least one display is selected from the group consisting of: a Liquid Crystal Display (LCD), a Light Emitting Diode (LED)-based display, an Organic LED (OLED)-based display, a micro OLED-based display, and a Liquid Crystal on Silicon (LCoS)-based display.

Optionally, the at least one projector is selected from the group consisting of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector.

The first client receives the second information indicative of the device pose of the second display device (hereinafter referred to as "second information", for sake of convenience only) from the second client. Optionally, the second client is configured to process tracking data obtained from the second means for tracking the device pose to derive the second information. Herein, the second client is communicably coupled to both the second means for tracking the device pose and the first client either directly, or via a communication network.

The first client sends the second information to the image server. The image server generates the second image frame based on the device pose of the second display device. In other words, the second image frame is consistent with the device pose of the second display device. The second information is effectively utilized by the image server to generate the second image frame. The image server then sends the second image frame to the first client. The first client receives the second image frame (from the image server), and then sends the second image frame to the second client. The second client renders the second image frame at the second display device.

It will be appreciated that the second display device, in operation, would attain a plurality of device poses. The second information would be updated with these plurality of device poses. Therefore, the image server would generate a plurality of second image frames, based on the plurality of device poses of the second display device. The second client would render the plurality of second image frames at the second display device.

Optionally, the second display device comprises at least one display and/or at least one projector configured to render the second image frame.

Optionally, when rendering a given image frame at a given display device, a given client is configured to store the given image frame into a given framebuffer associated with the given display device, wherein the given framebuffer drives at least one display and/or at least one projector of the given display device to render the given image frame at the given display device.

It will be appreciated that the image server is efficiently utilized by the first client for generating the first image frame and the second image frame. In particular, when generating a given image frame based on a device pose of a given display device, the image server has no knowledge of the given display device for which the given image frame is being generated. Therefore, no additional changes are required to be made to the image server for generating image frames for any number of display devices.

The aforesaid manner of generating and rendering the first image frame and the second image frame provides at the second display device a "remote rendering" experience using the same image server as that being employed for the first display device. In such a case, the user of the second display device may be understood to be a spectator in a same visual scene as the user of the first display device.

It will be appreciated that optionally a sequence of first image frames constitutes a first visual scene, whereas a sequence of second image frame constitutes a second visual scene. Both the first visual scene and the second visual scene are generated by the same image server. In other words, the image server can be understood to be shared between the first display device and the second display device. The first client and the second client render the first visual scene and the second visual scene at the first display device and the second display device, respectively, thereby enabling a collaboration mode for said display devices without making any changes to the image server.

Optionally, the first client is configured to encode the second image frame prior to sending to the second client. Optionally, the encoding of a given image frame is implemented via an encoder. Herein, the term "encoder" refers to specialized equipment that, in operation, encodes the given image frame. An encoded image frame requires lesser storage and transmission resources as compared to the given image frame. When encoded image frames are communicated to the second client, the encoded image frames are transmitted from the encoder to the second client in a bandwidth-efficient manner. Such an encoding operation also reduces lag between image frame generation and rendering.

Optionally, the first client is configured to process the first image frame, based on a difference between the device pose of the first display device and the device pose of the second display device, to virtually represent in the first image frame at least one of: the second display device, a user of the second display device, a body part of the user.

Optionally, in this regard, the first image frame is processed prior to rendering at the first display device. The first image frame represents visual content from a perspective of the first display device, which is dependent on the device pose of the first display device. When the first display device and the second display device are used in the same real-world environment, at least one of: the second display device, the user of the second display device, the body part of the user, may lie within the perspective of the first display device. As the first client is aware of the device poses of both the first display device and the second display device, the first client can determine the difference between the device pose of the first display device and the device pose of the second display device, and consequently, what lies within the perspective of the first display device. Therefore, the first client optionally processes the first image frame in the aforesaid manner to virtually represent in the first image frame at least one of: the second display device, the user of the second display device, the body part of the user. The first image frame, upon said processing, provides a realistic, pose-consistent view to be rendered at the first display device.

In an example, the first client may process the first image frame to virtually represent in the first image frame a face of the user of the second display device. The face of the user may, for example, be captured by gaze-tracking cameras of the second display device, or may be represented in a pre-stored image of the second user. The first client would obtain the captured image from said gaze-tracking cameras or the prestored image to generate the virtual representation of the face. The virtual representation of the face may, for example, be digitally painted on top of the first image frame. The virtual representation of a face of a given user may be considered to be an "avatar" of the given user.

In another example, the first client may process the first image frame to virtually represent in the first image frame at least one body part of the user of the second display device, wherein the at least one body part comprises at least one of: a face of the user, a hand of the user, a leg of the user.

In yet another example, the image server may generate image frames corresponding to an extended-reality shooting game. Let us consider that the user of the first display device and the user of the second display device are present in the same real-world environment for playing said game. When the device pose of the second display device is such that face and hands of the second user lie within a perspective of the first display device, the first image is processed to virtually represent the face and the hands of the second user in the first image frame.

Optionally, when processing the first image frame, the first client is configured to digitally superimpose upon or blend into the first image frame the virtual representation of at least one of: the second display device, the user of the second display device, the body part of the user. Optionally, in this regard, the blending of the virtual representation is performed when optical depth information of the real-world environment is available with the image server.

Optionally, the first client is configured to process the second image frame, based on a difference between the device pose of the first display device and the device pose of the second display device, to virtually represent in the second image frame at least one of: the first display device, a user of the first display device, a body part of the user.

Optionally, in this regard, the second image frame is processed prior to sending to the second client. The second image frame represents visual content from a perspective of the second display device, which is dependent on the device pose of the second display device. When the second display device and the first display device are used in the same real-world environment, at least one of: the first display device, the user of the first display device, the body part of the user, may lie within the perspective of the second display device. As the first client is aware of the device poses of both the first display device and the second display device, the first client can determine the difference between the device pose of the first display device and the device pose of the second display device, and consequently, what lies within the perspective of the second display device. Therefore, the first client optionally processes the second image frame in the aforesaid manner to virtually represent in the second image frame at least one of: the first display device, the user of the first display device, the body part of the user. The second image frame, upon said processing, provides a realistic, pose-consistent view to be rendered at the second display device.

In an example, the first client may process the second image frame to virtually represent in the second image frame a face of the user of the first display device. The virtual representation of the face may, for example, be digitally painted on top of the first image frame. In another example, the first client may process the second image frame to virtually represent in the second image frame at least one body part of the user of the first display device.

Optionally, when processing the second image frame, the first client is configured to digitally superimpose upon or blend into the second image frame the virtual representation of at least one of: the first display device, the user of the first display device, the body part of the user. Optionally, in this regard, the blending of the virtual representation is performed when optical depth information of the real-world environment is available with the image server.

Optionally, the first client is configured to:
predict a device pose of the second display device, based on previous device poses of the second display device;
send, to the image server, information indicative of the predicted device pose of the second display device;
receive, from the image server, an image frame generated based on the predicted device pose of the second display device; and
send the image frame to the second client,
wherein the second client is configured to render the image frame at the second display device.

It will be appreciated that viewing experience of the user of the second display device would be compromised if image frames are not rendered, or are rendered intermittently at the second display device. Such a situation would occur when the second client does not send the second information to the first client in a regular manner. Such irregularity in sending the second information may be, for example, not sending the second information at a due time, sending the second information intermittently, and the like. Said irregularity may occur due to a technical glitch of the second means for tracking the device pose, weak communication link between the first client and the second client, and the like. The first client optionally enables the aforesaid predictive device pose-based image frame generation and transmission for the second client in order to ensure that rendering of image frames at the second display device continues in a regular manner despite any irregularity in sending the second information. In the event of any irregularity, the first client keeps sending the image frames to the second client so that the user of the second display device would be provided a smooth viewing experience.

Optionally, when predicting the device pose of the second display device based on the previous device poses of the second display device, the device pose of the second display device is predicted by extrapolating the previous (tracked) device poses of the second display device. In an example, the previous (tracked) device poses of the second display device may indicate that said device poses follow a raster scan-like trajectory. Therefore, when a current device pose of the second display device corresponds to a left portion of the real-world environment, the first client may predict a next device pose of the second display device to correspond to a right portion of the real-world environment.

Optionally, the information indicative of the predicted device pose of the second display device is generated by the first client. When said information is sent to the image server, the image server generates a predicted device pose-consistent image frame for the second display device.

Optionally, the second display device is located remotely from the first display device, and wherein the first client is configured to:
select an initial device pose of the second display device in a manner that the initial device pose of the second display device is offset from a contemporaneous device pose of the first display device, wherein the initial device pose of the second display device is selected in a first coordinate space in which the device pose of the first display device is being tracked;
send, to the image server, information indicative of the initial device pose of the second display device;
receive, from the image server, an initial image frame generated based on the initial device pose of the second display device; and
send the initial image frame to the second client,
wherein the second client is configured to render the initial image frame at the second display device.

Optionally, in this regard, the first display device and the second display device are apart from each other. The first client optionally selects the initial device pose of the second display device in the first coordinate space by presuming the offset between the contemporaneous device pose of the first display device and a device pose of the second display device. Herein, the "initial device pose" of the second display device refers to a device pose of the second display device that is initially selected, by the first client, prior to receiving tracked device poses of the second display device. The initial device pose of the second display device is selected to be such that device poses of the first and second display devices do not overlap (as the users of the first and second display devices cannot have same overlapping pose in the real-world environment).

It will be appreciated that in some cases, the second client could join an ongoing session at the first client. In other words, it is not necessary that the first display device and the second display device start rendering image frames related to the ongoing session at the same time. In these cases, optionally, the selection of the initial device pose of the second display device, generation of the initial image frame and rendering of the initial image frame at the second display device enables the second client to render a pose-correct initial image frame (related to the ongoing session) which corresponds to the moment the second client joins the ongoing session at the first client.

The term "contemporaneous device pose" refers to the device pose of the first display device at the time when the second client joins a session ongoing at the first client. As the second display device is located remotely from the first display device, there would exist an offset between their device poses. The term "offset" refers to both a two-dimensional (2D) offset, as well as a 3D offset within the real-world environment in which the first and second display devices are present. When the heights of the users of the first and second display devices is same, the offset would be a 2D offset as the first display device and the second display device would lie at a same height at two different positions in a horizontal plane (namely, floor plane) within the real-world environment.

As an example, a teacher using the first display device may be engaged in an XR driving training session. When a student using the second display device joins the training session, required positions of the student and the teacher in the training session may be such that whilst the student takes an XR driving test while sitting, the teacher would be positioned just overlooking from behind the student's shoulder. In such an example, the initial device pose of the second display device would be selected in a manner that the initial device pose is offset from the contemporaneous device pose of the first display device by 100 centimeters. The initial image frame for the second display device would represent the extended-reality driving test from a perspective of the initial device pose. Furthermore, the first client may virtually represent in the first image frame, portions of back of the head and hands of the user of the second display device. In this way, both the student and the teacher would be shown realistic image frames of the XR driving training session.

Optionally, the initial device pose of the second display device is selected in the first coordinate space in which the device pose of the first display device is being tracked. The first coordinate space can be understood to be a local coordinate space of the first display device. Throughout the present disclosure, the term "coordinate space" refers to a 3D space wherein each point in the 3D space can be described using a given coordinate system. The given coordinate system would have a well-defined origin with respect to which each point's pose in the 3D space can then be described.

Optionally, the first client is configured to encode the initial image frame prior to sending to the second client.

Optionally, the first client is configured to:
receive, from the second client, information indicative of an actual initial device pose of the second display device, the actual initial device pose being tracked in a second coordinate space;
determine an alignment transform that when applied to the actual initial device pose of the second display device yields the selected initial device pose of the second display device; and
apply the alignment transform to the device pose of the second display device indicated in the second information, prior to sending the second information to the image server.

Herein, the term "actual initial device pose" refers to a device pose of the second display device that is tracked via the second means for tracking the device pose. The actual initial device pose of the second display device is optionally measured in the second coordinate space. The second coordinate space can be understood to be a local coordinate space of the second display device.

Throughout the present disclosure, the term "alignment transform" refers to a transformation operation to be employed to align different coordinate spaces with each other. Optionally, the alignment transform aligns the second coordinate space with the first coordinate space. In this process, the alignment transform aligns (namely, converts) a given coordinate in the second coordinate space to another coordinate in the first coordinate space. For example, a given coordinate having a position (2, 0, −3) in the second coordinate space may be aligned to another coordinate having a position (8, 0, −12) in the first coordinate space. In such an example, the alignment transform may be (6, 0, −9).

Optionally, when determining the alignment transform, the first client is configured to determine a difference between the actual initial device pose of the second display device and the selected initial device pose of the second display device, said difference being formulated as the alignment transform. Optionally, the alignment transform comprises a position alignment transform and/or an orientation alignment transform.

Optionally, the second client is configured to determine the alignment transform that when applied to the actual initial device pose of the second display device yields the selected initial device pose of the second display device.

When the alignment transform is optionally applied to the device pose of the second display device indicated in the second information, said device pose (which was determined in the second coordinate space) would be accurately transformed to a corresponding device pose in the first coordinate space. This would also beneficially ensure that change in device pose of the second display device from the initial device pose to the subsequent device pose is smooth. The first client is optionally configured to determine alignment transforms for all display devices among the plurality of display devices in the aforesaid manner.

Optionally, the system further comprises:
at least one detectable marker arranged on one of the first display device and the second display device; and
at least one detector arranged on other of the first display device and the second display device, wherein the at least one detector is configured to detect the at least one detectable marker and determine a relative pose of the at least one detectable marker with respect to the at least one detector,
wherein the first client is configured to align a first coordinate space in which the device pose of the first display device is being tracked with a second coordinate space in which the device pose of the second display device is being tracked, based on the relative pose of the at least one detectable marker with respect to the at least one detector.

Optionally, in this regard, the first display device and the second display device are physically located in a same real-world environment.

In an embodiment, the at least one detectable marker is arranged on the first display device, whereas the at least one detector is arranged on the second display device. In such a case, a relative pose of the first display device is determined with respect to the second display device.

In another embodiment, the at least one detector is arranged on the first display device, whereas the at least one detectable marker is arranged on the second display device. In such a case, a relative pose of the second display device is determined with respect to the first display device.

It will be appreciated that examples of the at least one detectable marker and the at least one detector have been provided earlier.

Optionally, the first coordinate space and the second coordinate space are local coordinate spaces of the first display device and the second display device. In such a case, both the first and second coordinate spaces would have different coordinate systems with reference to which device poses of their corresponding display devices are tracked. In this regard, the relative pose of the at least one detectable marker with respect to the at least one detector can be understood to be a device pose offset measure between the first display device and the second display device within the same real-world environment. Therefore, given a device pose of a given display device in its local coordinate space, and the relative pose of the given display device with respect to another display device, the first coordinate space and the second coordinate space can be aligned.

Optionally, when aligning the first coordinate space with the second coordinate space, the first client is configured to employ at least one alignment transform.

Optionally, the image server is configured to utilize an environment map to generate the given image frame. Optionally, the environment map is stored at a memory unit of the first computing device or a cloud-based memory communicably coupled to the first computing device. Optionally, when generating the given image frame, the image server accesses the environment map from the memory unit or the cloud-based memory. Optionally, the first client is configured to create and/or modify the environment map. Optionally, the environment map is utilized for generating both the first image frame and the second image frame. It will be appreciated that the environment map may be utilized for generating image frames for any number of display devices, as required.

Throughout the present disclosure, the term "environment map" refers to a data structure representative of the real-world environment in which a given display device is being used. The environment map comprises comprehensive information pertaining to the real-world environment. Optionally, the environment map comprises information indicative of at least one of: optical depths of objects within the real-world environment with respect to cameras that capture images indicative of the optical depths, features of the objects detected from captured visible-light images of the real-world environment, physical shapes of objects that are determined based on processing the optical depth information and the features of the objects, materials of the objects or their portions, information regarding lights and lighting conditions within the real-world environment, objects (for example, such as input devices) associated with a given display device that is present in the real-world environment, detectable markers within the real-world environment (for example, detectable markers on a given display device, on walls of the real-world environment, and the like), detected body pose and/or physical features (such as hands, legs) of a user of a given display device.

Optionally, at least a portion of the information pertaining to the real-world environment is collected via sensors associated with a given display device present in the real-world environment. Examples of such sensors include, but are not limited to, cameras mounted on the given display device, detector(s) arranged on the given display device, light sensors arranged on the given display device, and the means for tracking the device pose of the given display device. It will be appreciated that when multiple display devices are present in the real-world environment, sensor data (namely, the aforesaid information collected via the sensors) can be collected from the multiple display devices. The sensor data can optionally be updated at regular intervals. Such sensor data can then be shared amongst the multiple display devices.

It will be appreciated that optionally using the environment map to generate image frames for multiple display devices enhances the shared rendering experience between the multiple display devices without making any changes to the image server. The image server utilizes information within the environment map to generate pose-consistent image frames for the multiple display devices in an efficient manner. Given a device pose of a given display device, information pertaining to a region of the real-world environment that lies within the perspective of the given display device can be extracted from the environment map. This information can subsequently be used for generating an image frame for the given display device. Image frame generation using the environment map is fast and accurate, as the environment map includes an extremely comprehensive description of the real-world environment.

Optionally, when a device pose of a given display device is such that no information pertaining to a region of the real-world environment that lies within the perspective of the given display apparatus exists in the environment map, real-time information pertaining to said region is collected via sensors associated with a given display device. In this regard, said real-time information is stored into the environment map and is used by the image server to generate an accurate image frame for the given display device.

As an example, the real-world environment may be a gaming arcade wherein multiple users engage in a multi-player XR shooting game using multiple XR headsets. A user may wear an XR headset on his/her head. The multiple users could be positioned at different locations within the gaming arcade and may have different head orientations. As a result, device poses of the multiple XR headsets would be different. In such an example, the environment map can be beneficially utilized to generate pose-consistent and realistic XR image frames pertaining to the multi-player XR shooting game for the multiple XR headsets.

Optionally, the first display device and the second display device comprise at least one first camera and at least one second camera, respectively, and wherein the first client is configured to:

obtain, from the first display device, a plurality of first images of a real-world environment captured by the at least one first camera along with information indicative of corresponding device poses of the first display device with respect to which the plurality of first images are captured;

receive, from the second client, a plurality of second images of the real-world environment captured by the at least one second camera along with information indicative of corresponding device poses of the second display device with respect to which the plurality of second images are captured; and process the plurality of first images and the plurality of second images, based on the corresponding device poses of the first display device and the corresponding device poses of the second display device, respectively, to create the environment map.

Optionally, the first client is configured to send, to the image server, the environment map. The environment map is utilized by the image server for generating pose-consistent image frames for the plurality of display devices.

Herein, the term "camera" refers to equipment that is operable to detect and process light from the real-world environment, so as to capture images of the real-world environment. Optionally, the at least one first camera and the at least one second camera comprise a camera chip, wherein the light from the given real-world environment is directed by at least one optical element onto a photosensitive surface of the camera chip, thereby enabling the at least one first camera and the at least one second camera to capture the plurality of first images and the plurality of second images, respectively, of the given real-world environment.

Optionally, the a given camera is implemented as at least one of: a digital camera, a RGB-D camera, a Light Detection and Ranging (LiDAR) camera, a Time-of-Flight (ToF) camera, a laser rangefinder, a plenoptic camera, a stereo camera, a dual pass-through camera. Moreover, optionally, a given camera is implemented as at least one of: an infrared camera, a hyperspectral camera.

In an embodiment, the number of first images in the plurality of first images is same as number of second images in the plurality of second images. In another embodiment, the number of first images in the plurality of first images is different from the number of second images in the plurality of second images.

Optionally, the plurality of first images represent the real-world environment from perspectives of the device poses of the first display device, whereas the plurality of second images represent the real-world environment from perspectives of the device poses of the second display device. The plurality of first images and the plurality of second images can be understood to be sensor data of the at least one first camera and the at least one second camera, respectively. Said sensor data forms at least a portion of the information pertaining to the real-world environment, which is comprised in the environment map.

It will be appreciated that the first client optionally processes the plurality of first images and the plurality of second images, based on the corresponding device poses of the first display device and the corresponding device poses of the second display device, respectively, to create an information-rich and accurate environment map. As an example, the device poses of the first and second display devices enable the first client to ascertain a logical inter-arrangement of first images and second images to create an environment map that emulates the real-world environment. The environment map so created accurately depicts the objects and attributes (for example, such as physical shapes, optical depths materials, and the like) of the objects within the real-world environment from various perspectives of the device poses of the first and second display devices.

In an embodiment, the plurality of first images and the plurality of second images comprise pairs of stereo images. Optionally, the pairs of stereo images are analyzed to generate a depth map. Optionally, in this regard, pixels of a pair of stereo images that represent a given three-dimensional point in the real-world environment are matched. Then, binocular disparities between matching pixels of the pair of stereo images are determined. The binocular disparities are processed (for example, using triangulation process) to determine the optical depths of the objects with respect to the at least one first camera and/or the at least one second camera. The optical depths of the objects within the real-world environment are represented in the depth map. Notably, the "depth map" is a data structure comprising the optical depths of the objects within the real-world environment.

In another embodiment, the plurality of first images and the plurality of second images comprise depth images of the real-world environment, which are utilized to generate the depth map. The depth images comprise information pertaining to the optical depths of the objects within the real-world environment with respect to the at least one first camera and/or the at least one second camera.

It will be appreciated that the plurality of first images and the plurality of second images of the real-world environment are "video see-through images" of the real-world environment. These video see-through images can optionally be utilized for generating XR images for the first display device and the second display device. Optionally, a given XR image is generated by overlaying at least one virtual object on a given video see-though image. A virtual object can be understood to be a computer-generated object.

Optionally, the first client is configured to:
send, to the image server, a given first image and a given second image;
receive, from the image server, a first XR image frame and a second XR image frame, the first XR image frame being generated based on the given first image, the second XR image frame being generated based on the given second image;
render the first XR image frame at the first display device;
send the second XR image frame to the second client, wherein the second client is configured to render the second XR image frame at the second display device.

Optionally, in this regard, the first client is configured to send the environment map to the image server, wherein the image server is configured to utilize the environment map when generating the first XR image frame and the second XR image frame.

Optionally, the first client is configured to:
receive, from the second client, information indicative of a region in the environment map towards which a user associated with the second display device is pointing; and
process the first image frame and/or the second image frame to virtually represent in the first image frame and/or the second image frame a pointer pointing towards the region.

Optionally, in this regard, the information indicative of the region in the environment map towards which the user associated with the second display device is pointing is generated by an input device associated with the second display device. Optionally, in this regard, said information comprises a location of said region in the environment map.

Throughout the present disclosure, the term "input device" refers to a specialized device that is to be used by a user associated with a given display device to interact with images being rendered at the given display device. Notably, the user provides an input by pointing towards a particular region in the real-world environment whereat he/she is using the given input device. As the environment map is representative of the real-world environment, a given client associated with the given display device can identify the region in the environment map towards which the user is pointing, based on the user's input. Examples of input device may include, but are not limited to, a computer mouse, a keyboard, a joystick, a touchpad, a gamepad, an interactive board, a remote controller, a simulated reality console, an XR controller, a trackball.

It will be appreciated that the region in the environment map towards which the user associated with the second display device is pointing may be represented in the first image frame and/or the second image frame. In such a case, the first client optionally processes the first image frame and/or the second image frame to virtually represent therein, the pointer pointing to the region. Said processing is performed prior to rendering at the first display device and/or the second display device, thereby enabling the user(s) of the first display device and/or the second display device to view exactly where the user associated with the second display device is pointing. Such processing is extremely beneficial in cases where the users interact with each other in a collaborative manner using their respective display devices.

Herein, the term "pointer" refers to a visual indicator of where a user is pointing. Optionally, the pointer is virtually represented as at least one of: a circle, a symbol, an arrow, a target, a cursor, a coloured indicator, a flashing indicator, a textual instruction, a graphical instruction.

In an example, the user of the second display device may point, via an XR controller associated with the second display device, at an object in a given region of a multiplayer extended-reality shooting game. Said region may be represented in a central portion of the second image frame as well as a right portion of the first image frame. In such an example, both the first image frame and second image frame may be processed to virtually represent a pointer (for example, such as a target depicted by two concentric circles) in their corresponding central and right portions, respectively.

Optionally, the first client is configured to:

identify, based on an input received at an input device associated with the first display device, a region in the environment map towards which a user associated with the first display device is pointing; and process the first image frame and/or the second image frame to virtually represent in the first image frame and/or the second image frame a pointer pointing towards the region.

It will be appreciated that the region in the environment map towards which the user associated with the first display device is pointing, may be represented in the first image frame and/or the second image frame. In such a case, the first client optionally processes the first image frame and/or the second image frame to virtually represent therein, the pointer pointing to the region. Said processing is performed prior to rendering at the first display device and/or the second display device, thereby enabling the user(s) of the first display device and/or the second display device to view exactly where the user associated with the second display device is pointing. Such processing is extremely beneficial in cases where the users interact with each other in a collaborative manner using their display devices.

Optionally, the first client is configured to utilize the image server to generate first image frames and second image frames for the first display device and the second display device at a first frame rate and a second frame rate, respectively. Herein, the term "frame rate" refers to a frequency (namely, a rate) at which image frames are generated for a given display device. Frame rates are generally expressed in terms of frames per second (FPS). For example, a given display device requires image frames to be generated for it at a frame rate of 90 frames per second.

In an embodiment, the first frame rate is equal to the second frame rate. For example, the first frame rate and the second frame rate may be equal to 60 FPS. In another embodiment, the first frame rate is different from the second frame rate. In one case, the first frame rate is greater than the second frame rate. For example, the first frame rate may be equal to 90 FPS, whereas the second frame rate may be equal to 60 FPS. In another case, the second frame rate is greater than the first frame rate. For example, the second frame rate may be equal to 90 FPS, whereas the first frame rate may be equal to 60 FPS.

It will be appreciated that different display devices may require different frame rates of image frame generation, owing to differences in their processing capabilities, display and/or projector specifications, and the like. Optionally, in some instances, a given display device needs image frames at a higher frame rate than other display devices for. In such a case, prioritization of image server resources is optionally done to cater to different frame rate requirements of different display devices. For example, the user of the second display device might be in review mode whilst interacting with a sequence of second image frames, whereas the user of the first display device may be actively engaged with the sequence of first image frames. In such an example, the first frame rate may be greater than the second frame rate. As a result, image frames would appear to be rendered more smoothly at the first display device as compared to the second display device.

Optionally, the first image frame and the second image frame have a first resolution and a second resolution, respectively. Throughout the present disclosure, the term "resolution" refers to visual detail that a given image frame holds. Herein, the term "resolution" refers to "image resolution", "spatial resolution", or "angular resolution".

The term "image resolution" refers to pixel detail of a given image frame. The image resolution is typically measured as the number of pixels (namely, horizontal pixels× vertical pixels) associated with the given image frame. The "spatial resolution" of a given image frame refers to a number of pixels per inch (also referred to as points per inch (PPI)) in the given image frame. The "angular resolution" of a given image frame refers to a number of pixels per degree (namely, points per degree (PPD)) of an angular width of the given image frame, wherein the angular width is measured from the perspective of the user's eye. Notably, an increase in the angular resolution results in an increase in the number of pixels per degree and a decrease in an angular pixel size. A high angular resolution of the given image frame or its portion is indicative of high visual detail within the given image frame.

In an embodiment, the first resolution is equal to the second resolution. For example, the first resolution and the second resolution may be equal to 640 pixels×800 pixels.

In another embodiment, the first resolution is different from the second resolution. In one case, the first resolution is greater than the second resolution. For example, the first resolution may be equal to 480 pixels per inch, whereas the second resolution may be equal to 360 pixels per inch. In another case, the second resolution is greater than the first resolution. For example, the second resolution may be equal to 60 pixels per degree, whereas the first resolution may be equal to 45 pixels per degree.

It will be appreciated that different image frames may be generated for different display devices, based on visual quality requirements of the different display devices. Instead of overburdening the image server to generate high-resolution image frames for all different display devices which may or may not require them, the processing resources of the image server are efficiently managed to generate image frames having custom-resolution image frames for each display device, as per requirement.

The present disclosure also relates to the method as described above. Various embodiments and variants disclosed above, with respect to the aforementioned first aspect, apply mutatis mutandis to the method.

Optionally, the method further comprises:

predicting a device pose of the second display device, based on previous device poses of the second display device;

sending, to the image server, information indicative of the predicted device pose of the second display device;

generating, at the image server, an image frame based on the predicted device pose of the second display device;

receiving, from the image server, the image frame;

sending the image frame to the second client; and rendering the image frame at the second display device.

Optionally, in the method, the second display device is located remotely from the first display device, and the method further comprises:

selecting an initial device pose of the second display device in a manner that the initial device pose of the second display device is offset from a contemporaneous device pose of the first display device, wherein the initial device pose of the second display device is selected in a first coordinate space in which the device pose of the first display device is being tracked;

sending, to the image server, information indicative of the initial device pose of the second display device;

generating, at the image server, an initial image frame based on the initial device pose of the second display device;

receiving, from the image server, the initial image frame;

sending the initial image frame to the second client; and rendering the initial image frame at the second display device.

Optionally, the method further comprises:

receiving, from the second client, information indicative of an actual initial device pose of the second display device, the actual initial device pose being tracked in a second coordinate space;

determining an alignment transform that when applied to the actual initial device pose of the second display device yields the selected initial device pose of the second display device; and applying the alignment transform to the device pose of the second display device indicated in the second information, prior to sending the second information to the image server.

Optionally, the method further comprises utilizing the image server to generate first image frames and second image frames for the first display device and the second display device at a first frame rate and a second frame rate, respectively.

Optionally, in the method, the first image frame and the second image frame have a first resolution and a second resolution, respectively.

Optionally, in the method, at least one detectable marker is arranged on one of the first display device and the second display device, and at least one detector is arranged on other of the first display device and the second display device, and the method further comprises:

detecting, via the at least one detector, the at least one detectable marker and determining a relative pose of the at least one detectable marker with respect to the at least one detector; and aligning a first coordinate space in which the device pose of the first display device is being tracked with a second coordinate space in which the device pose of the second display device is being tracked, based on the relative pose of the at least one detectable marker with respect to the at least one detector.

DETAILED DESCRIPTION OF THE DRAWINGS

Referring to FIG. 1, illustrated is a block diagram of an architecture of a system 100 for facilitating shared rendering between a plurality of display devices, in accordance with an embodiment of the present disclosure. The plurality of display devices comprises a first display device and a second display device that are communicably coupled with a first computing device and a second computing device, respectively, the first computing device being communicably coupled with the second computing device.

The system 100 comprises:

means 102 for tracking a device pose of the first display device;

means 104 for tracking a device pose of the second display device;

an image server 106, executing on at least one processor of the first computing device, configured to generate a given image frame based on a given device pose;

a first client 108 executing on the at least one processor of the first computing device; and a second client 110 executing on at least one processor of the second computing device, wherein the first client 108 is configured to:

send, to the image server 106, first information indicative of the device pose of the first display device;

receive, from the image server 106, a first image frame generated based on the device pose of the first display device;

render the first image frame at the first display device;

receive, from the second client 110, second information indicative of the device pose of the second display device;

send, to the image server 106, the second information;

receive, from the image server 106, a second image frame generated based on the device pose of the second display device; and send the second image frame to the second client 110, wherein the second client 110 is configured to render the second image frame at the second display device.

Figure 2:
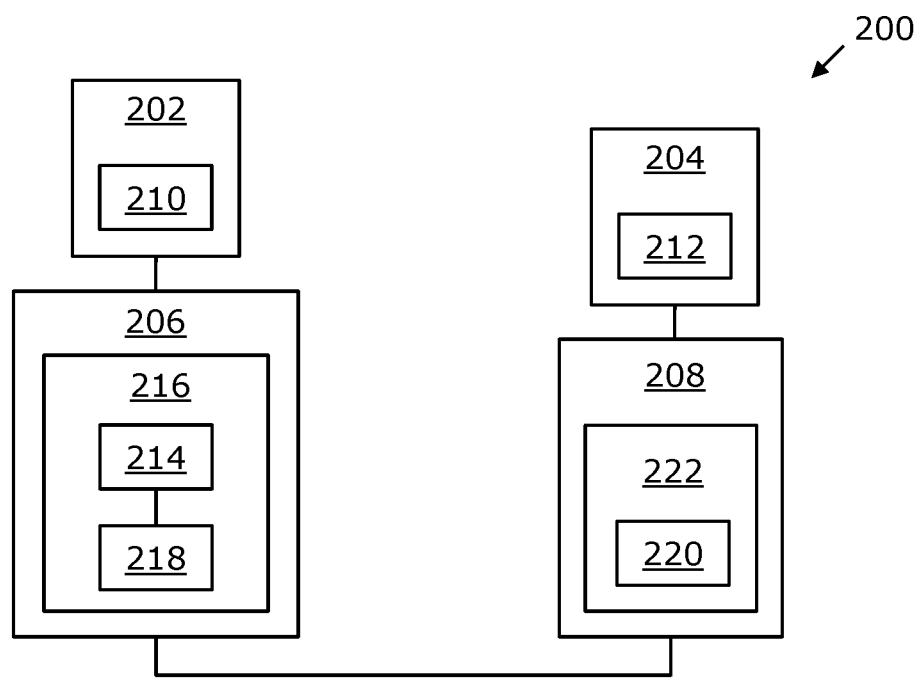
FIGS. 2 and 3 illustrate exemplary environments in which a system for facilitating shared rendering between a plurality of display devices is used, in accordance with different embodiments of the present disclosure.

Referring to FIG. 2, illustrated is an exemplary environment 200 in which a system for facilitating shared rendering between a plurality of display devices is used, in accordance with an embodiment of the present disclosure. The plurality of display devices comprise a first display device 202 and a second display device 204 that are communicably coupled with a first computing device 206 and a second computing device 208, respectively, the first computing device 206 being communicably coupled with the second computing device 208. The system comprises:

means 210 for tracking a device pose of the first display device 202;

means 212 for tracking a device pose of the second display device 204;

an image server 214, executing on at least one processor 216 of the first computing device 206, configured to generate a given image frame based on a given device pose;

a first client 218 executing on the at least one processor 216 of the first computing device 206; and a second client 220 executing on at least one processor 222 of the second computing device 208.

Herein, the first client 218 is communicably coupled to the image server 214. Furthermore, the first client 218 is communicably coupled to the second client 220 either directly, or via a communication network (not shown).

Figure 3:
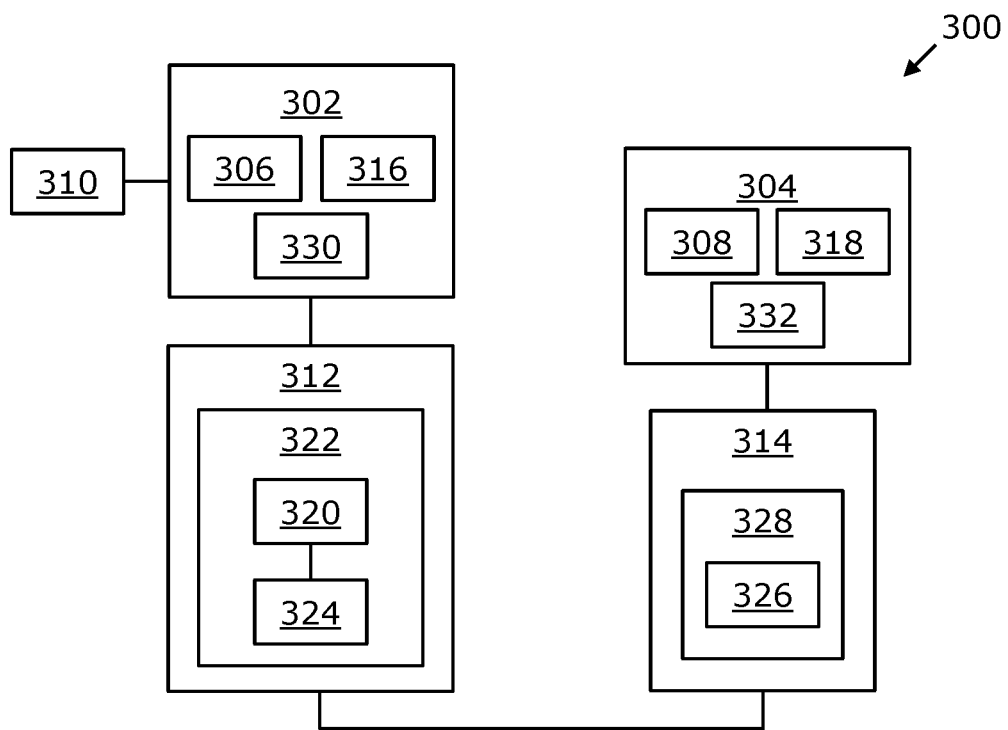

Referring to FIG. 3, illustrated is an exemplary environment 300 in which a system for facilitating shared rendering between a plurality of display devices is used, in accordance with another embodiment of the present disclosure. The plurality of display devices comprises a first display device 302 and a second display device 304. The first display device 302 and the second display device 304 comprise at least one first camera (depicted as a first camera 306) and at least one second camera (depicted as a second camera 308), respectively. Furthermore, an input device 310 is associated with the first display device 302. The first display device 302 and the second display device 304 are communicably coupled with a first computing device 312 and a second computing device 314, respectively, the first computing device 312 being communicably coupled with the second computing device 314.

The system comprises:

means 316 for tracking a device pose of the first display device 302;

means 318 for tracking a device pose of the second display device 304;

an image server 320, executing on at least one processor 322 of the first computing device 312, configured to generate a given image frame based on a given device pose;

a first client 324 executing on the at least one processor 322 of the first computing device 312; and a second client 326 executing on at least one processor 328 of the second computing device 314.

Herein, the first client 324 is communicably coupled to the image server 320 and the second client 326.

The system further comprises at least one detectable marker (depicted as a detectable marker 330) arranged on the first display device 302 and at least one detector (depicted as a detector 332) arranged on the second display device 304. Alternatively, the detectable marker 330 could be arranged on the second display device 304, while the detector 332 could be arranged on the first display device 302.

It may be understood by a person skilled in the art that the FIGS. 2 and 3 are merely examples for sake of clarity, which should not unduly limit the scope of the claims herein. The person skilled in the art will recognize many variations, alternatives, and modifications of embodiments of the present disclosure. For example, an input device (not shown) may be associated with the second display device 304.

Figure 4:
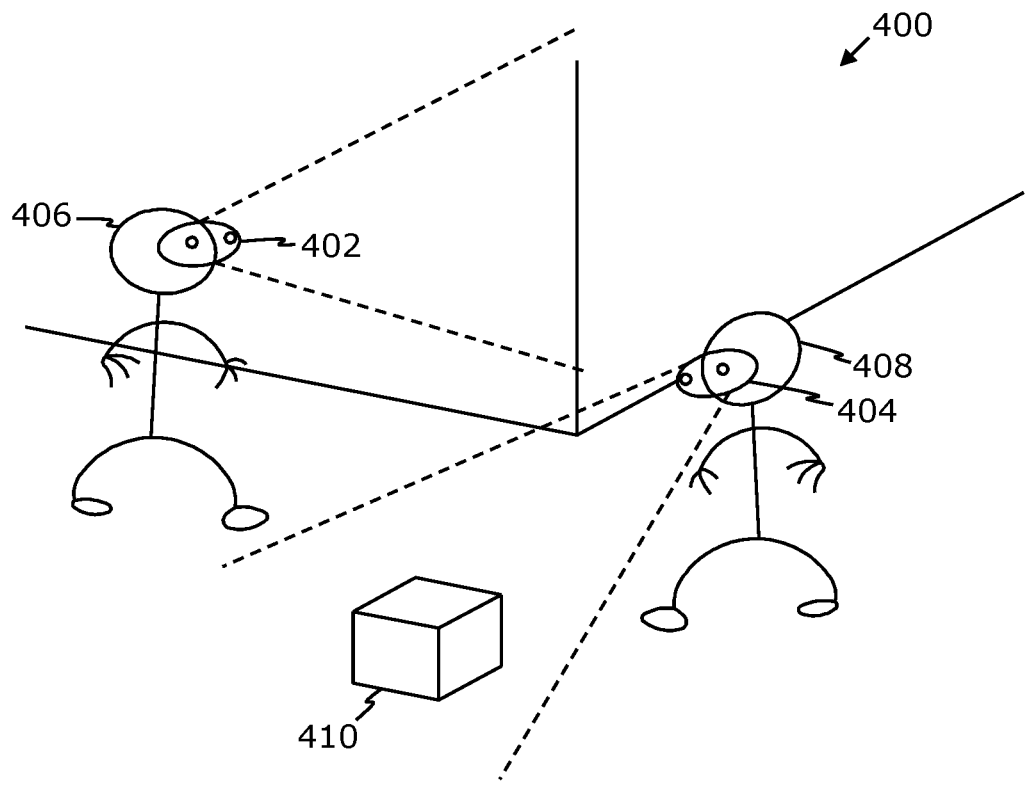
FIG. 4 is a schematic illustration of users using a system for facilitating shared rendering between a plurality of display devices in an exemplary real-world environment, in accordance with an embodiment of the present disclosure.

Referring to FIG. 4, illustrated is a schematic illustration of users using a system for facilitating shared rendering between a plurality of display devices in an exemplary real-world environment 400, in accordance with an embodiment of the present disclosure. Herein, a first display device 402 and a second display device 404 are worn by a first user 406 and a second user 408, respectively, on their heads. Device poses of the first display device 402 and the second display device 404 are depicted to be different from each other. The exemplary real-world environment 400 also includes an object 410. The system facilitates shared rendering between the first display device 402 and the second display device 404 in a manner that pose-consistent image frames are generated for and rendered at both the first display device 402 and the second display device 404. For example, according to the depicted device poses, a first image frame generated for the first display device 402 would virtually represent head of the second user 408, whereas a second image frame generated for the second display device 404 would virtually represent the object 410.

It may be understood by a person skilled in the art that the FIG. 4 is merely an example for sake of clarity, which should not unduly limit the scope of the claims herein. The person skilled in the art will recognize many variations, alternatives, and modifications of embodiments of the present disclosure.

Figure 5A:
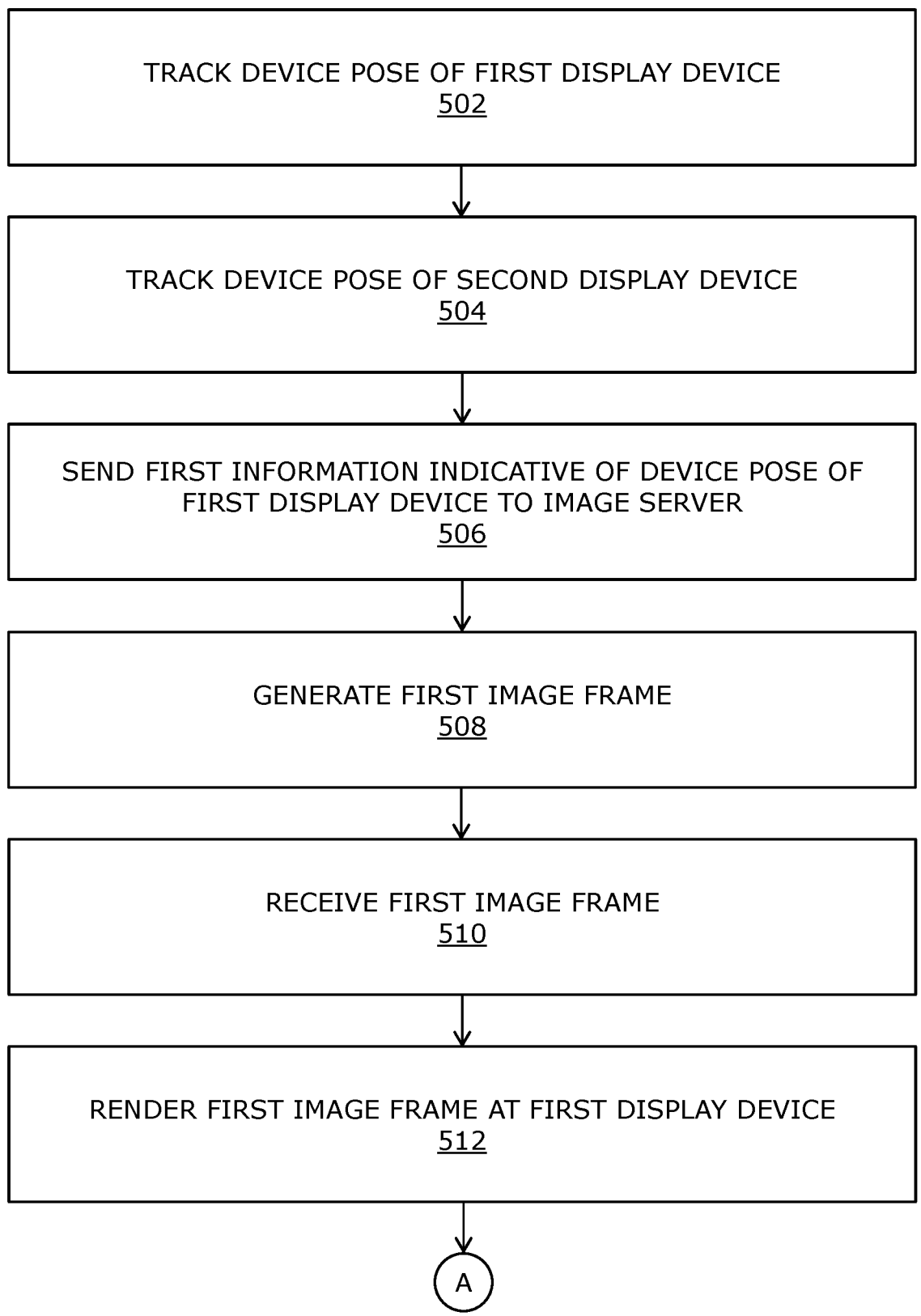
FIGS. 5A and 5B illustrate steps of a method of facilitating shared rendering between a plurality of display devices, in accordance with an embodiment of the present disclosure.
Figure 5B:
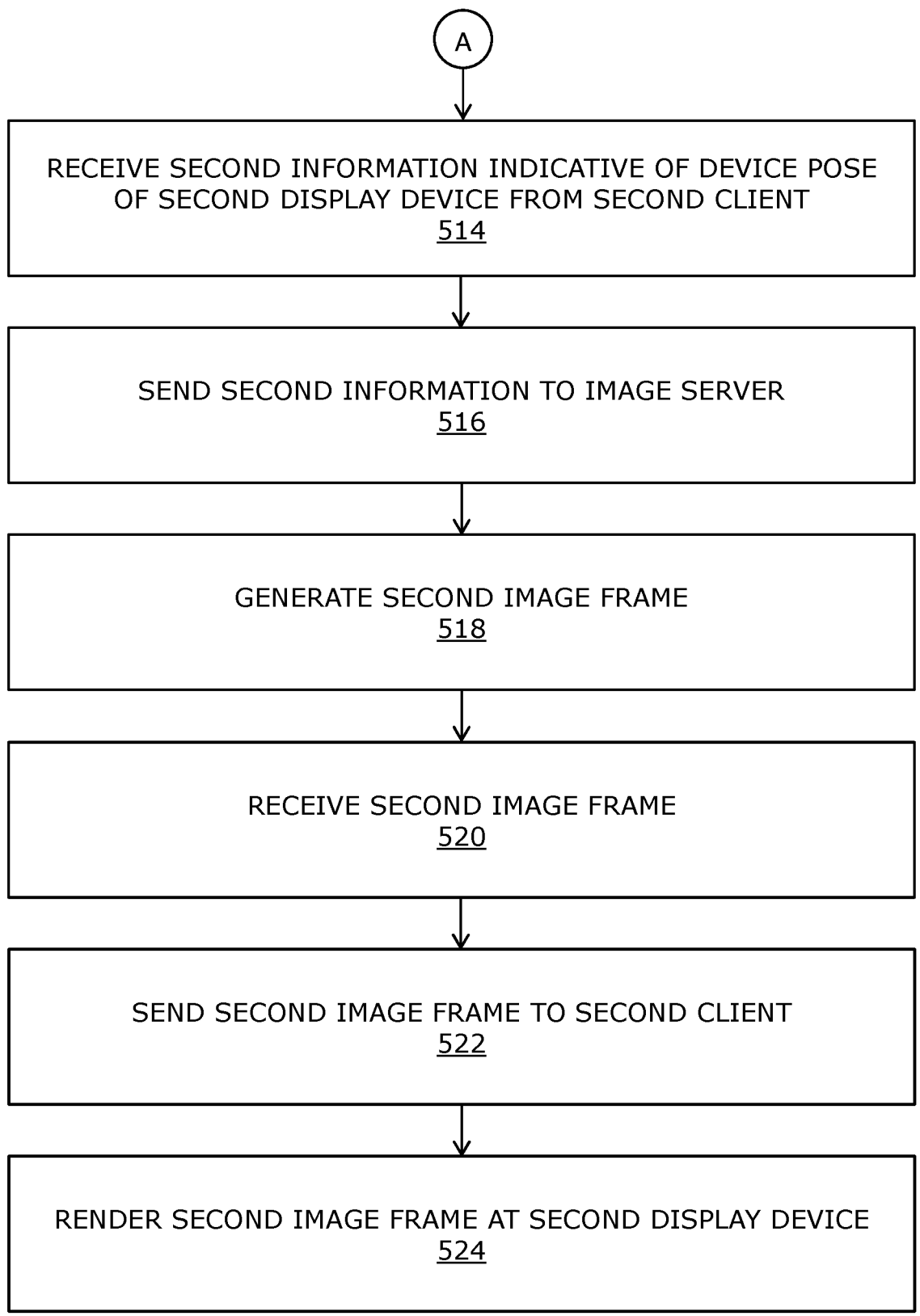

Referring to FIGS. 5A and 5B, illustrated are steps of a method of facilitating shared rendering between a plurality of display devices, in accordance with an embodiment of the present disclosure. The plurality of display devices comprise a first display device and a second display device that are communicably coupled with a first computing device and a second computing device, respectively, the first computing device being communicably coupled with the second computing device. At step 502, a device pose of the first display device is tracked. At step 504, a device pose of the second display device is tracked. At step 506, first information indicative of the device pose of the first display device is sent from a first client to an image server, wherein the first client and the image server are executing on at least one processor of the first computing device. At step 508, a first image frame is generated based on the device pose of the first display device, at the image server. At 510, the first image frame is received (by the first client) from the image server. At 512, the first image frame is rendered (by the first client) at the first display device. At step 514, second information indicative of the device pose of the second display device is received (by the first client) from a second client executing on at least one processor of the second computing device. At step 516, the second information is sent from the first client to the image server. At step 518, a second image frame is generated based on the device pose of the second display device, at the image server. At step 520, the second image frame is received (by the first client) from the image server. At step 522, the second image frame is sent (by the first client) to the second client. At step 524, the second image frame is rendered (by the second client) at the second display device.

The steps 502 to 524 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method of facilitating shared rendering between a plurality of display devices, the plurality of display devices comprising a first display device and a second display device that are communicably coupled with a first computing device and a second computing device, respectively, the first computing device being communicably coupled with the second computing device, the method comprising:
    tracking a device pose of the first display device;
    tracking a device pose of the second display device;
    sending, from a first client to an image server, first information indicative of the device pose of the first display device, wherein the first client and the image server are executing on at least one processor of the first computing device;
    generating, at the image server, a first image frame based on the device pose of the first display device;
    receiving, from the image server, the first image frame;
    rendering the first image frame at the first display device;
    receiving, from a second client executing on at least one processor of the second computing device, second information indicative of the device pose of the second display device;
    sending, from the first client to the image server, the second information;
    generating, at the image server, a second image frame based on the device pose of the second display device;
    receiving, from the image server, the second image frame;
    sending, to the second client, the second image frame; and
    rendering the second image frame at the second display device.

2. The method of claim 1, further comprising:
    predicting a device pose of the second display device, based on previous device poses of the second display device;

sending, to the image server, information indicative of the predicted device pose of the second display device;

generating, at the image server, an image frame based on the predicted device pose of the second display device;

receiving, from the image server, the image frame;

sending the image frame to the second client; and rendering the image frame at the second display device.

3. The method of claim 1, wherein the second display device is located remotely from the first display device, and wherein the method further comprises:

selecting an initial device pose of the second display device in a manner that the initial device pose of the second display device is offset from a contemporaneous device pose of the first display device, wherein the initial device pose of the second display device is selected in a first coordinate space in which the device pose of the first display device is being tracked;

sending, to the image server, information indicative of the initial device pose of the second display device;

generating, at the image server, an initial image frame based on the initial device pose of the second display device;

receiving, from the image server, the initial image frame;

sending the initial image frame to the second client; and rendering the initial image frame at the second display device.

4. The method of claim 3, further comprising:

receiving, from the second client, information indicative of an actual initial device pose of the second display device, the actual initial device pose being tracked in a second coordinate space;

determining an alignment transform that when applied to the actual initial device pose of the second display device yields the selected initial device pose of the second display device; and applying the alignment transform to the device pose of the second display device indicated in the second information, prior to sending the second information to the image server.

5. The method of claim 1, further comprising utilizing the image server to generate first image frames and second image frames for the first display device and the second display device at a first frame rate and a second frame rate, respectively.

6. The method of claim 1, wherein the first image frame and the second image frame have a first resolution and a second resolution, respectively.

7. The method of claim 1, wherein at least one detectable marker is arranged on one of the first display device and the second display device, and at least one detector is arranged on other of the first display device and the second display device, and wherein the method further comprises:

detecting, via the at least one detector, the at least one detectable marker and determining a relative pose of the at least one detectable marker with respect to the at least one detector; and aligning a first coordinate space in which the device pose of the first display device is being tracked with a second coordinate space in which the device pose of the second display device is being tracked, based on the relative pose of the at least one detectable marker with respect to the at least one detector.

* * * * *